Oct. 5, 1971  W. B. BROSIUS, JR  3,610,042
LIQUID LEVEL MEASURING DEVICE WITH TEMPERATURE COMPENSATOR
Filed Aug. 22, 1969
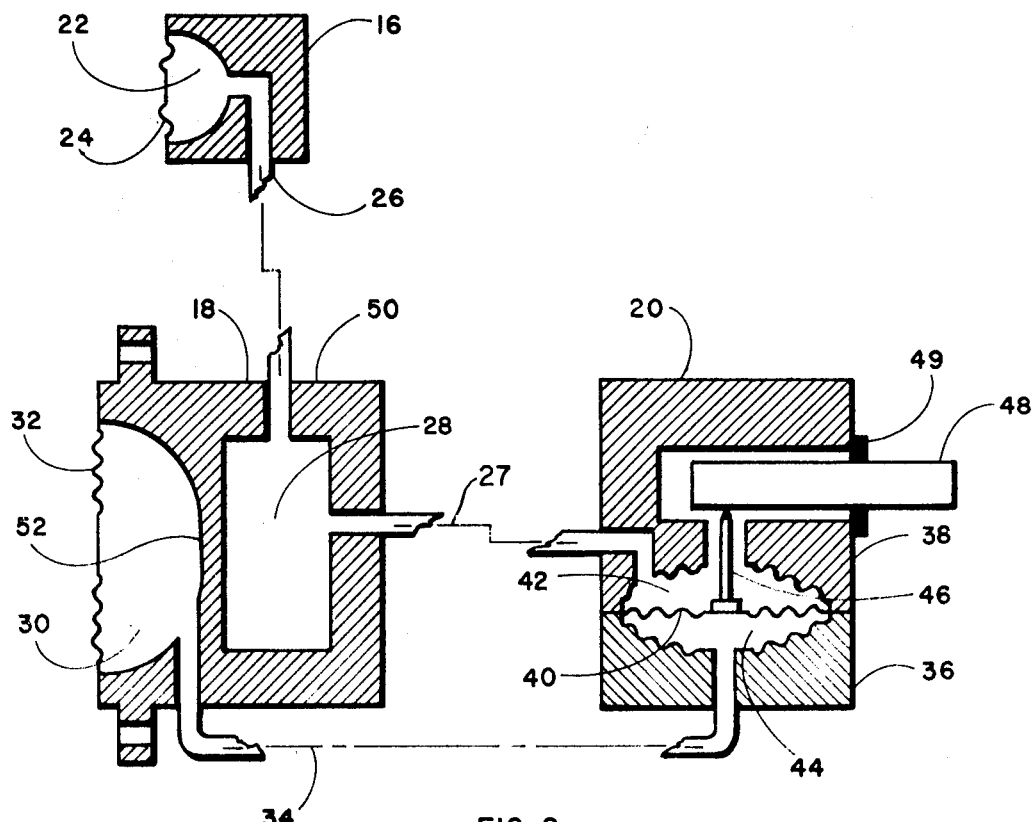
FIG. 2
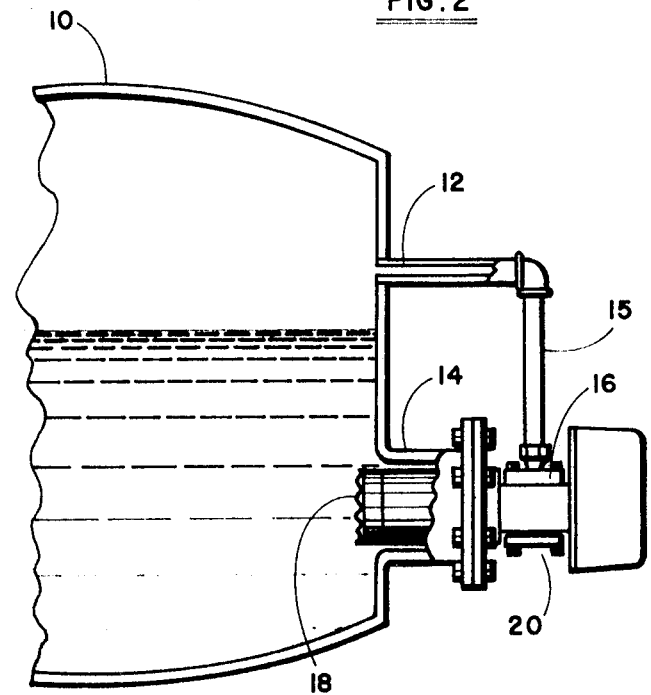
FIG. 1
*INVENTOR.*
WILLIAM B. BROSIUS JR.
BY

United States Patent Office 3,610,042
Patented Oct. 5, 1971

3,610,042
LIQUID LEVEL MEASURING DEVICE WITH TEMPERATURE COMPENSATOR
William B. Brosius, Jr., Fairport, N.Y., assignor to Sybron Corporation, Rochester, N.Y.
Filed Aug. 22, 1969, Ser. No. 852,372
Int. Cl. G01f 23/16; G01l 19/04
U.S. Cl. 73—299
2 Claims

ABSTRACT OF THE DISCLOSURE

Device for measuring liquid level in which the high and low side pressures are hydraulically transmitted through silicone filled chambers to a primary diaphragm common to both chambers wherein deflection of the diaphragm responsive to the differential pressure is representative of the depth of the liquid. Pressure differentials caused by thermal expansion of the silicone are compensated by having the chambers in a heat exchange relationship so that heat can be transferred from one to another to maintain the silicone in both chambers at substantially the same temperature.

BACKGROUND OF THE INVENTION

The present invention relates to a differential pressure measuring system as may be used for indicating and/or controlling liquid level and, more particularly, to such a system wherein one element of the system may be exposed to a different temperature environment than another.

Differential pressure measuring devices for measuring liquid level are known in the art. Such a device, for example, might employ one pressure sensor exposed to the high pressure beneath the surface of the liquid being measured and a low pressure sensor exposed either to atmospheric pressure or to the pressure above the surface of the liquid. The differential in pressure between these two sensors is representative of the depth of the liquid. In such devices, a chamber completely filled with any suitable liquid, such as silicone, extends from the high side pressure sensor to the low side pressure sensor. This silicone filled chamber is divided into two closed sections by a moveable diaphragm so that both the high and low side pressures are hydraulically transmitted to the diaphragm through the silicone. Any differential pressure between the high and low side pressure sensors is reflected by the relative movement of the diaphragm.

In cases where the differential pressure measuring device is used as a level indicator, the high and low side pressure sensors may be exposed to a different temperature environment as well as a different pressure. This could happen, for example, where the liquid is being heated so that the temperature adjacent the bottom of the heating tank is at a temperature higher than either atmospheric temperature or the temperature above the level of the liquid. With the high and low pressure sensors at different temperatures, a differential pressure may be produced which reflects the relative thermal expansion of the silicone in one sensor with respect to another. This differential pressure due to the relative thermal expansion or volumetric changes of the silicone introduces an error with respect to the differential pressure produced by the liquid level so that the actual liquid level may be higher or lower than the differential pressure reading would indicate. In the prior art, mechanical means such as bimetal strips have been used to compensate for any error which might be caused by thermal expansion in the liquid fill.

SUMMARY OF THE PRESENT INVENTION

In the present invention, a liquid filled differential pressure device is provided wherein at least a portion of the liquid filled compartments of the high and low side pressure sensors are passed one adjacent the other in a heat exchange relationship to maintain the liquid in both the high and low side pressure sensors at substantially the same tmeperature.

OBJECTS OF THE INVENTION

It is an object of the present invention to provide a liquid filled level measuring device having means to compensate for a temperature differential between the high and low side pressure sensors.

Another object of the present invention is to provide a liquid filled level measuring device which reduces errors in the differential pressure reading attributed to thermal expansion of the liquid fill.

A further object of the present invention is to provide a liquid filled level measuring device wherein the liquid fill from the high and low side sensors are in a heat exchange relationship.

Yet another object of the present invention is to provide a liquid filled level measuring device which eliminates the need for mechanical compensation of pressure differential between the high and low side produced by thermal expansion of the liquid fill in one chamber with respect to the liquid in another.

These and other objects, advantages and characterizing features of the present invention will become more apparent upon consideration of the following detailed description thereof when taken in connection with the accompanying drawing.

DESCRIPTION OF THE DRAWINGS

FIG. 1 is a schematic representation of a liquid filled tank employing the level measuring device of the present invention; and FIG. 2 is a schematic representation in section of the liquid level measuring device of the present invention.

DESCRIPTION OF THE PREFERRED EMBODIMENTS

Referring to the drawings, FIG. 1 shows a tank 10 having a low side tap 12 above or adjacent the surface of the liquid to be measured and a high side tap 14 at some point beneath the surface of the liquid and preferably adjacent the bottom of the tank. Communicating with taps 12 and 14 are a low side pressure sensor 16 and a high side pressure sensor 18 respectively. Each pressure sensor in turn is in communication with a differential pressure device generally indicated at 20 provided for correlating the difference in pressure between sensors 16 and 18 to the level of the liquid in tank 10.

FIG. 1 shows low side pressure sensor 16 communicating with tap 12 through an open pipe 15; however, it should be appreciated that the low side pressure sensor can be either exposed to atmosphere so as to eliminate both tap 12 and pipe 15 or attached directly to tap 12 with a capillary 26, 27 (FIG. 2) connecting the sensor to pressure differential device 20.

High and low side pressure sensors are similar in construction. For example, FIG. 2 shows low side sensor 16 to comprise a low side chamber 22 having one wall formed by a flexible low side diaphragm 24. Communicating with chamber 22 is a capillary 26, 27 which connects the chamber to the differential pressure device 20. In cases where low side pressure sensor 16 is exposed to atmosphere or is in communication through pipe 15 to the tank, the low side pressure sensor can be formed as part of the differential pressure device 20 so as to keep the length of capillary 26, 27 to a minimum. Where low side pressure sensor 16 is attached directly to low side tap 12 or is at some remote location, the capillary 26, 27 will be relatively long.

The high side pressure sensor includes a high side chamber 30 having one wall formed by a flexible high side diaphragm 32 and a fluid passage 34 which connects chamber 30 to the differential pressure device. Preferably, the chambers and all fluid passages are completely filled with a fluid such as silicone so that movement of diaphragms 24 and 32 responsive to pressures in the tank is hydraulically transmitted to the pressure differential device. That is, all the volume enclosed between diaphragms 24 and 32 is occupied by liquid with neither voids nor gas bubbles existing to any significant extent in this volume.

The differential pressure measuring device 20 for resolving the high and low side pressures to a differential pressure corresponding to the level of liquid in tank 10 includes a primary diaphragm assembly having two sections 36 and 38. Clamped between these two sections is a corrugated primary diaphragm 40 which forms a low side pressure chamber 42 on one side of the diaphragm and a high side pressure chamber 44 on the other. With chambers 42 and 44 connected by fluid passages 26, 27 and 34 to the low and high side sensors respectively, it should be appreciated that the high and low side diaphragms 24 and 32 form the flexible end walls of a closed, silicone filled chamber extending from the low side sensor to the high side sensor wherein primary diaphragm 40 divides the chamber into two closed hydraulic systems.

Fixed to the primary diaphragm is a stem 46 which connects the diaphragm to a force beam 48 for transmitting movement of the primary diaphragm to the force beam. The stem and force beam are well known in the art and it is sufficient for purposes of the present invention merely to say that the distance through which the force beam is moved by the primary diaphragm and stem can be correlated to the level of liquid in tank 10. Further, a seal 49 of any suitable known construction isolates the liquid filled interior of the measuring system from the atmosphere external to the system, and the beam is constrained (by means not illustrated) solely to deflection about an axis which, in ordinary practice, would be normal to the plan of FIG. 2 and about at seal 49. Deflection of beam 48, of course, reflects the difference between high and low side pressures, and therefore, provides a measurement of liquid level and would be used in one or another of various well-known ways in measuring and/or controlling liquid level in the tank 10.

As set out hereinabove, temperature differential may exist between the high and low side pressure sensors 16, 18. For example, the high side pressure sensor 18 is exposed to the temperature below the surface of the liquids while low side pressure sensor 16 may be exposed to the temperature-pressure environment either within the tank, or atmosphere. In any case, the silicone fill in each chamber 22, 30 will assume the temperature of its environment. If the silicone fill in each chamber 22, 30 is at a different temperature, the volumetric expansion of the silicone in one chamber will be different than the expansion of the silicone in the other chamber. This difference in the relative volumetric change will, in turn, affect the differential pressure across primary diaphragm 40, in the following manner. Expansion of the volume of the liquid fill pushes against the high side or low side diaphragm and thrusts the diaphragm outward to accommodate the increase in volume of the liquid fill. Because the diaphragm has a finite stiffness (that is, it is not infinitely flexible), the outward thrust is accompanied by a proportional pressure increase in the liquid fill, therefore, a temperature differential produces a differential pressure which would distort the liquid level measurement, were it not for the present invention.

In order to prevent this error, the present invention places the silicone fill of one pressure sensor in a heat exchange relationship with the silicone fill of the other in order to reduce the temperature differential between the liquid fills of the high and low side sensors. Preferably, the both liquid fills will be maintained at substantially the same temperature. Placing the silicone fill of both the high and low pressure sides in a heat exchange relationship can be accomplished, for example, simply by passing one fluid passage adjacent another for a portion of their length or by coiling one capillary about another. In the usual situation, it is the temperature of the liquid in the tank that changes as opposed to the atmospheric temperature or temperature above the surface of the liquid, therefore, the preferred manner of compensating for this temperature change is to provide a portion of the low side fill liquid at or near the same temperature as that of the high side liquid fill, immediately adjacent to the high side diaphragm 32 and therefore at the approximate temperature of the contents of tank 10.

This is done by providing housing 50 which forms the support for the high side diaphragm 32 and which contains the high side chamber 30. Housing 50 is made of a heat conducting material and is clamped by any suitable means to the high side tap 14 to expose at least part of the housing to the liquid contents of vessel 10. Formed within the housing is a reservoir 28 which communicates through fluid capillaries 26, 27 with both the low side chamber 22 and the low side pressure chamber 42. Reservoir 28 and high side chamber 30 are separated by a rigid, heat conducting wall 52 so that heat can pass freely between the reservoir and high side chamber. Preferably, the volume of reservoir 28 should be approximately equal to the volume of high side chamber 30 so that any temperature change in both the reservoir and chamber 30 would be expected to induce approximately equal volumetric changes in both the high and low side hydraulic systems. Maintaining the two hydraulic systems at substantially the same temperature to substantially nullify the effect of a temperature change of the liquid insures an accurate reading of the level of liquid in tank 10. For purposes of clarity, these high and low side hydraulic systems may be described as follows: the high side system has one end defined by diaphragm 32 and includes chamber 30, passage 34 and chamber 44 with the other end of the high side hydraulic system being defined by diaphragm 40. The low side hydraulic system has one end defined by diaphragm 24 and includes chamber 22, capillary 26, chamber 28, capillary 27 and chamber 42 with the other end of the low side system being defined by diaphragm 40.

While the present invention has been described with respect to the most common situation, that is, a temperature change of the liquid being measured, it should be appreciated that providing a reservoir in heat exchange relationship with the low side pressure chamber 22 will compensate for a temperature change of the environment of the low side pressure sensor. Further, it should be appreciated that having a reservoir in heat exchange relationship with both the high and low side chambers 30 and 22 will compensate for a temperature change of the environment of either the high or low side pressure sensors.

Thus, it will be appreciated that the present invention accomplishes its intended objects in providing a hydraulic system for measuring liquid level which compensates for a temperature change of the environment of either the high or low side pressure sensors.

Having thus described the invention in detail, what is claimed as new is:

1. A liquid level measuring apparatus with temperature compensator comprising:
    (a) a housing having a first pressure chamber therein with one wall of said chamber being flexible and exposed to a pressure-temperature condition below the level of the liquid being measured;

(b) a reservoir chamber in said housing isolated from said first chamber by a common, rigid, heat conducting wall;

(c) a second pressure chamber having one wall thereof flexible and exposed to the pressure-temperature conditions above the level of the liquid being measured;

(d) a movable diaphragm disposed between and hydraulically connected to said first and second pressure chambers by two closed hydraulic systems, a first hydraulic system extending between said first pressure chamber and said diaphragm and a second hydraulic system extending between said diaphragm and said second pressure chamber, said diaphragm moving responsive to the differential pressure at said first and second pressure chambers wherein said movement responsive to the pressure differential is indicative of the level of the liquid being measured;

(e) conduit means connecting said reservoir chamber to both said second pressure chamber and said diaphragm to place said reservoir chamber in said second hydraulic system between said second pressure chamber and said diaphragm; and (f) said rigid heat conducting wall allowing the transfer of heat between said reservoir chamber and said first pressure chamber for maintaining said two closed hydraulic systems at substantially the same temperature for preventing a differential pressure across said diaphragm caused by a temperature differential between said first and second pressure chambers.

2. Apparatus as set forth in claim 1 wherein the volume of said reservoir chamber is substantially the same as the volume of said first pressure chamber.

References Cited

UNITED STATES PATENTS

| 1,394,336 | 10/1921 | Novick | 73—299 |
| 1,413,235 | 4/1922 | Novick | 73—299 |
| 2,274,479 | 2/1942 | Inderdohnen | 73—393 |

FOREIGN PATENTS

| 1,084,903 | 9/1967 | Great Britain | 73—407 |

LOUIS R. PRINCE, Primary Examiner

D. E. CORR, Assistant Examiner

U.S. Cl. X.R.

73—393